United States Patent [19]

Richter

[11] 4,032,807

[45] June 28, 1977

[54] INSIDE-OUT MOTOR/ALTERNATOR WITH HIGH INERTIA SMOOTH ROTOR

[75] Inventor: Eike Richter, Scotia, N.Y.

[73] Assignee: General Electric Company, Schenectady, N.Y.

[22] Filed: Jan. 6, 1976

[21] Appl. No.: 646,970

[52] U.S. Cl. ............................... 310/178; 310/64; 310/67 R

[51] Int. Cl.² ..................................... H02K 31/00

[58] Field of Search ............ 310/178, 219, 67, 266, 310/268, 262, 62–64, 112–114, 74, 153; 322/48; 318/283

[56] References Cited

UNITED STATES PATENTS

| | | | |
|---|---|---|---|
| 2,857,534 | 10/1958 | Beach | 310/74 |
| 3,290,525 | 12/1966 | Sudmeier | 310/153 |
| 3,508,091 | 4/1970 | Kavanaugh | 310/67 |
| 3,512,021 | 5/1970 | Laurent | 310/67 |
| 3,663,850 | 5/1972 | Phelon | 310/153 |
| 3,737,695 | 6/1973 | Richter | 310/168 |
| 3,831,049 | 8/1974 | Korotenko | 310/178 |
| 3,944,865 | 3/1976 | Jewitt | 310/178 |

OTHER PUBLICATIONS

Steinmetz; Publication TK2181.57; Theory & Calculation of Elect. Apparatus; N.Y.; 1917.

Primary Examiner—R. Skudy
Attorney, Agent, or Firm—Marvin Snyder; Joseph T. Cohen; Jerome C. Squillaro

[57] ABSTRACT

A multipole homopolar inductor motor/alternator for a flywheel drive includes a rotor assembly on the outside of the stator which functions as the flywheel. Locating the excitation field winding on the stator between two stacks of stator laminations enables the rotor assembly to be operated at much higher temperatures than a wound rotor, without detrimental effect on overall efficiency. The rotor assembly is also operable at much higher speeds than would be possible if the rotor were wound, resulting in apparatus better adapted to store energy mechanically.

20 Claims, 3 Drawing Figures

INSIDE-OUT MOTOR/ALTERNATOR WITH HIGH INERTIA SMOOTH ROTOR

INTRODUCTION

This invention relates to rotating electrical machines, and more particularly to a compact flywheel motor/generator drive of relatively high efficiency.

Flywheel motor/generator drives have been receiving increasing attention for application in vehicles as energy storage devices. This, in large measure, is because flywheel motor/generator sets allow a significantly higher energy transfer rate than possible with presently-available secondary batteries. In order to recover energy efficiently when a moving vehicle is in the braking condition, or to transfer energy efficiently into the vehicle during acceleration, energy transfer time should not exceed ten seconds to one minute, depending upon vehicular speed level.

Any flywheel motor/generator drive to be used on a vehicle should preferably comprise a small and lightweight unit exhibiting minimal electrical losses and minimal friction and windage losses. Electrical losses reduce the amount of energy transferred into and out of the flywheel. Moreover, since the time allocable for energy transfer is usually much less than the free-running time, low friction and windage losses are very important with respect to overall system efficiency.

Still another consideration affecting adoption of flywheel motor/generator drives involves the manufacturing and operation costs of the unit. Use of modern, aircraft-type wound rotor alternators for vehicular application can be prohibitive because of the complexity and associated expense of these devices. Thus it would be desirable to provide a compact flywheel motor/generator drive for vehicles, which will exhibit the desiderata of low windage losses, high efficiency, and low manufacturing and maintenance costs, as well as small size and low weight.

Accordingly, one object of the invention is to provide a compact, lightweight motor/generator of high rotor inertia.

Another object is to provide a flywheel motor/generator drive of low manufacturing and maintenance cost.

Another object is to provide an inductor motor/alternator having a rotor of low windage losses and improved mechanical integrity located outside the stator.

Briefly, in accordance with a preferred embodiment of the invention, a lightweight, compact, homoplar motor/alternator comprises a stator yoke and an excitation field winding encircling the mid-axial region of the stator yoke. First and second stacks of stator laminations encircle the stator yoke on either axial side of the excitation field winding. A plurality of stator windings are situated in axially-directed slots formed by being punched or etched into the first and second stacks of stator laminations. An inner rotor ring comprising alternate magnetic poles and nonmagnetic regions encircles each stack of stator laminations and is rotatable thereabout. An outer rotor ring encircles, and is bonded to, each inner rotor ring, the outer rotor ring comprising a high strength magnetic material.

BRIEF DESCRIPTION OF THE DRAWINGS

The features of the invention believed to be novel are set forth with particularly in the appended claims. The invention itself, however, both as to organization and method of operation, together with further objects and advantages therefore, may best be understood by reference to the following description taken in conjunction with the accompanying drawings in which:

DESCRIPTION OF TYPICAL EMBODIMENTS

Figure 1:
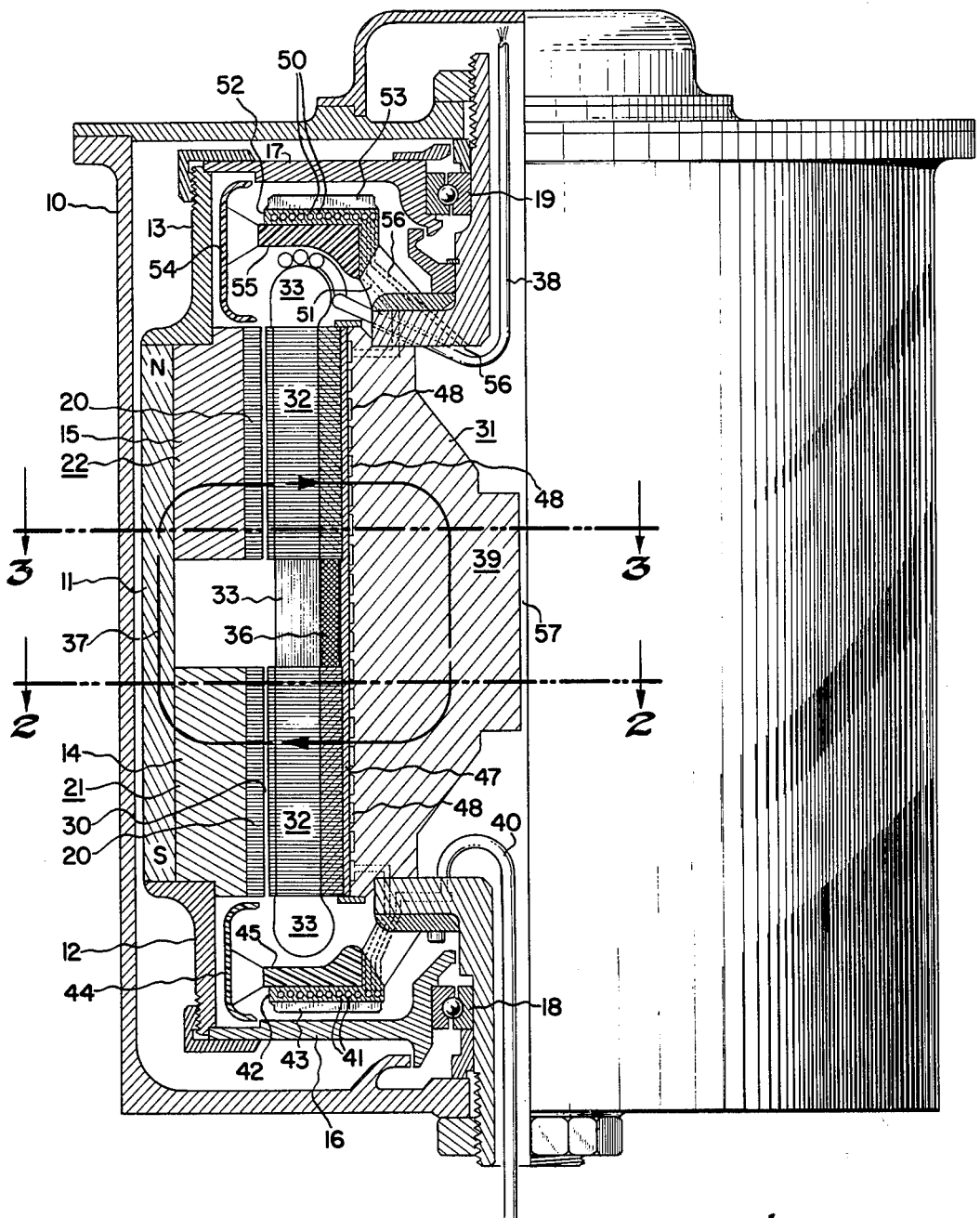
FIG. 1 is a partial cross sectional side view of a homopolar inductor motor/alternator constructed in accordance with the teachings of the invention.
Figure 2:
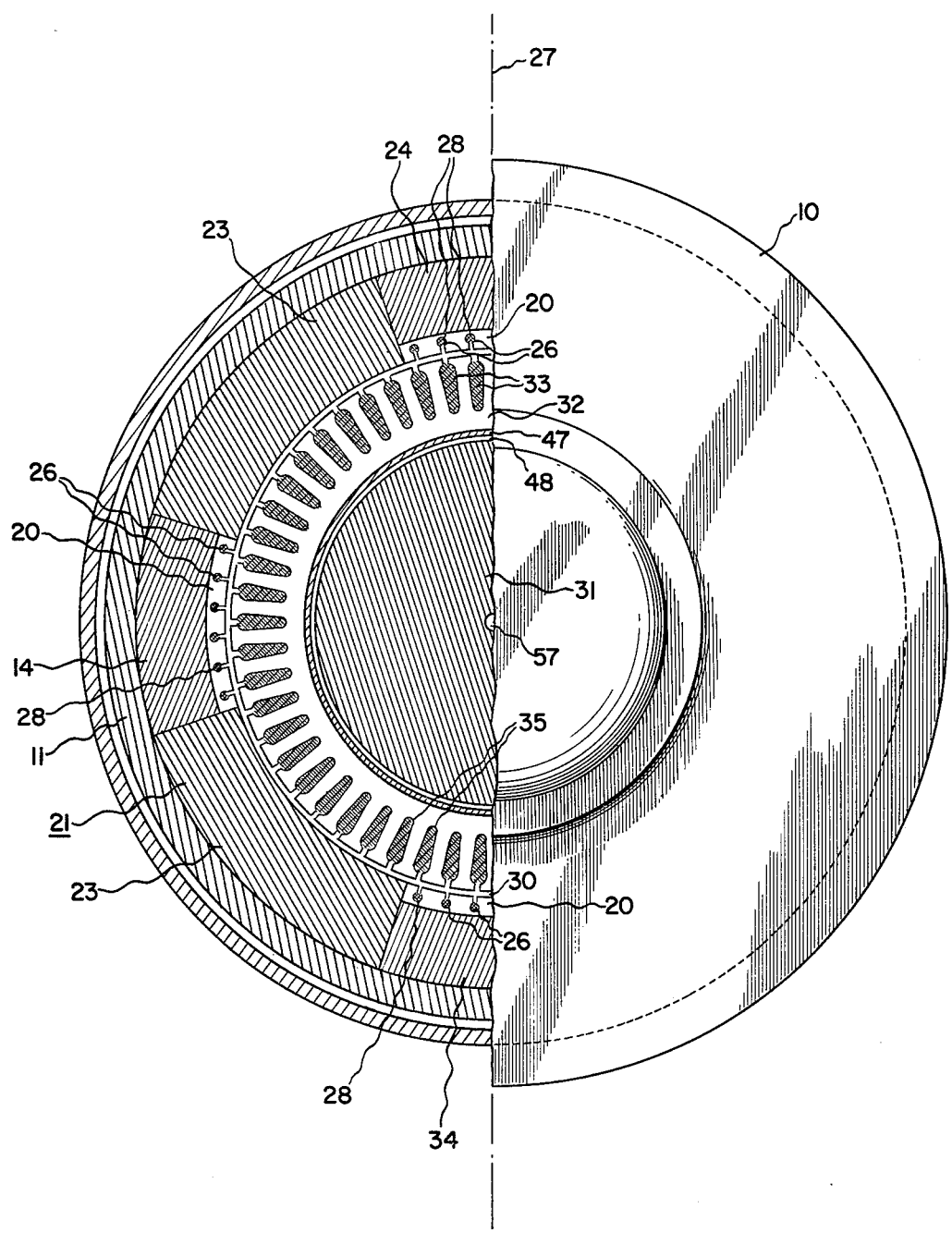
FIG. 2 is a section view of the apparatus of FIG. 1, taken along line 2—2.

FIG. 1 illustrates a homopolar inductor motor/alternature having a stationary frame, preferably of steel, enclosing a solid magnetic outer rotor ring 11 mounted on nonmagnetic (e.g. stainless steel) support brackets 12 and 13. First and second axially-separated magnetic poles 14 and 15 comprised, for example, of solid magnetic steel, are attached to outer rotor ring 11, as by bolts (not shown), so as to constitute a low magnetic reluctance path with the outer rotor ring. Other axially-separated magnetic poles are spaced radially in the rotor. For example, since the machine of FIG. 1 may employ four pairs of poles in the rotor, FIG. 2, which is a sectional view taken along line 2—2 of FIG. 1, shows two other rotor poles 24 and 34 radially spaced 90° on either side of pole 14. Similarly FIG. 3, which is a sectional view taken along line 3—3 of FIG. 1, shows pole 15 and 25 spaced radially apart from each other by 90°. In each case, the spacing is achieved by nonmagnetic material 23, preferably a metal such as stainless steel. Each of the cylinders formed by the magnetic poles including pole 14 and adjacent nonmagnetic spacers 23, and by the magnetic poles including pole 15 and adjacent nonmagnetic spacers 23, constitutes an inner rotor ring 21 and 22, respectively. Comparison of FIGS. 2 and 3 with respect to horizontal axis 27 shows that the magnetic poles of FIG. 2 are angularly displaced substantially by 45° from the magnetic poles of FIG. 3. The purpose of this offset is to avoid the cancellation of voltges induced in conventional stator windings which would occur if the offset were zero degrees.

To reduce pole losses resulting from eddy currents, a plurality of magnetic steel laminations 20 are affixed to the inner surfaces, or faces, of each of the magnetic poles such as poles 14 and 15 shown in FIG. 1, as by welding or brazing. A plurality of short-circuited turns, or amortisseur windings, 26 are positioned in axially-directed slots 28 formed in laminations 20, as shown in FIG. 2, in order to provide the rotor with a damping characteristic. The entire rotor assembly, which includes inner rotor rings 21 and 22, outer rotor ring 11, and laminations 20, as well as nonmagnetic support brackets 12 and 13, is supported on metallic end disks 16 and 17 which are rotatable about bearings 18 and 19, respectively.

Figure 3:
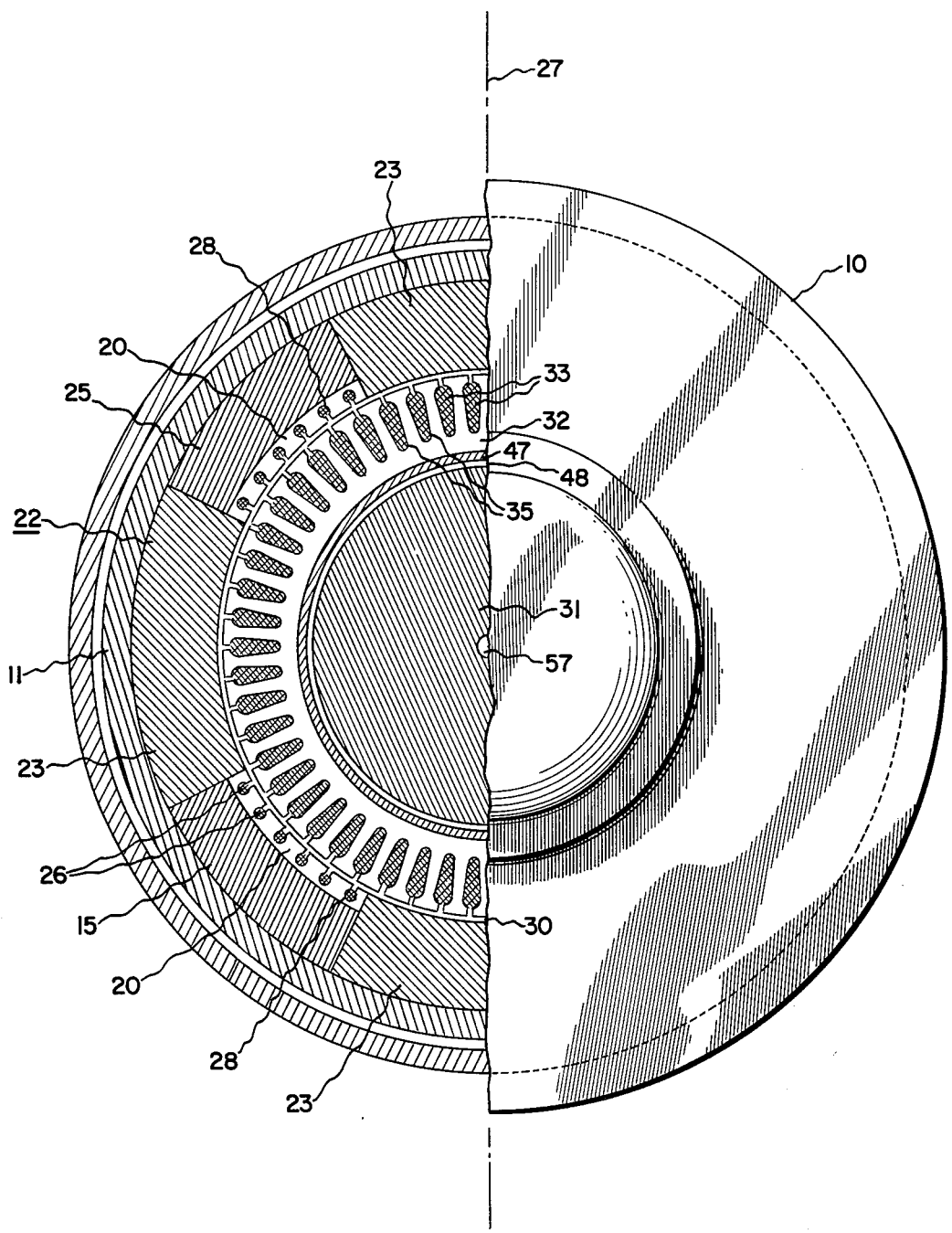
FIG. 3 is a section view of the apparatus of FIG. 1, taken along line 3—3.

A stator 31 surrounded over its axial length by outer rotor ring 11 and its associated magnetic poles, and separated therefrom by a small air gap 30, includes two outer sets of circular laminations 32 of magnetic steel through which are passed conventional axially-directed stator windings 33. These windings are contained in slots 35 formed in lamintations 32, as illustrated in FIGS. 2 and 3. Between the two sets of stator lamintations 32 and radially inward of armature windings 33 are field windings 36, energized from a source of direct current (not shown). The field windings create a unidirectional magnetic flux path 37 which passes through outer rotor ring 11, magnetic poles 14 and 15, stator laminations 32, and solid stator yoke 39. Thus windings 33 are situated in the unidirectional magnetic field established by field windings 36. Assuming the direct current in field windings 36 flows into the plane of the diagram, flux path 37 assumes a generally clockwise direction as shown in FIG. 1, producing a notrh pole at the upper axial end of outer rotor ring 11 and a south pole at the lower axial end of outer rotor ring 11, indicated by the designations N and S, respectively.

When operated as a motor, stator windings 33 are energized with a-c power through a pair of leads 38 connected directly thereto. No slip rings are required since there are no rotor windings to energize. Similar connections (not shown) to stationary field windings 36 permit establishment of magnetic field 37 which interacts with the a-c field created by armature windings 33 to exert forces on the south poles of inner rotor ring 21 and on the north poles of inner rotor ring 22, tending to cause rotation of the rotor. Since the rotor assembly has a larger effective radius than it would have in a conventional machine of the same horsepower rating, its inertia, which varies as the fourth power of the effective radius of the rotor assembly, is greatly increased over that of a conventional machine.

When operated as a generator, stationary field windings 36 again establish a field of magnetic flux 37 which rotates with the rotor assembly and cuts stator windings 33 as the rotor assembly turns. The rotating field thus produced by the rotor assembly establishes an alternating current in windings 33 which is supplied through leads 38. As in the case of operation as a motor, no slip rings are employed. Also as in the case of operation as a motor, the rotor assembly exhibits high inertia due largely to the fact that inertia varies with the fourth power of the effective rotor assembly radius. Thus in both motor and generator operating modes, the machine of the present invention exhibits a much higher rotor inertia than conventional machines of comparable horsepower ratings. The resulting higher inertia is equivalent to that which would be obtained using a conventional machine of comparable horsepower rating with a flywheel of predetermined size and mass attached to the rotor in order to achieve increased inertia.

Since excitation field winding 36 of the machine is located on the stator between the two stacks 32 of stator laminations, no electrical losses are experienced by the rotor assembly other than those resulting from electromagnetic losses in the rotor assembly innermost surfaces due to air gap harmonics of the magnetic field. Consequently, the rotor assembly can operate at much higher temperatures then would rotors without detrimental effect on overall efficiency of the machine.

Flywheel energy storage systems generally include a high speed, high inertia flywheel for energy storage and coupled to it a device facilitating transfer of kinetic energy into or out of the flywheel. Such device typically comprises a rotating electrical machine which can operate as a motor as well as a generator. The electrical machine is coupled to the flywheel either directly or through a gear train. Although direct coupling requires the machine to operate at the same high angular velocity as the flywheel, it is advantageous because it reduces overall size and weight of the system. The present invention achieves a still further reducton in system size and weight by investing the rotor of the electrical machine with sufficient inertia to function as the flywheel itself without in any way adversely affecting performance of the machine. Because of material fatigue and material relaxation problenms extant when a wound rotor alternator is employed in such application, a solid rotor type machine is considerably more advantageous; that is, by employing continuous ring 11 of high-strength magnetic material on the outside of the rotor assembly, not only is an improved weight efficiency achieved, but also the rotor assembly mechanical integrity is improved. Moreover, by making the surface of the rotor assembly smooth according to the teachings of Richter et al. U.S. Pat. No. 3,737,696 issued June 5, 1973 and assigned to the instant assignee, windage losses are greatly reduced. Additionally, the multiple homopolar inductor machine allows simplification in manufacturing and reduction in cost in comparison to a conventional outside coil Lundell type machine.

Cooling of the machine, whether operated as a motor or generator, is achieved by supplying a flow of coolant, such as oil, from an external source (not shown) through a duct 40 to tubing 41 in a nonmagnetic metallic heat exchanger 42 having cooling fins 43 attached thereto. Heat exchanger 42 is attached to an electrically-insulating nonmagnetic support 45 which holds a nonmagnetic gas baffle 44.

Coolant emerging from heat exchanger 42 flows axially through a stator passageway comprising generally circular, interconnected grooves 48 (which may be formed in a helical configuration in the axial direction) confined by a cylindrical enclosure 47 of low magnetic reluctance metal around stator yoke 39. Upon emerging from passageway 48, the coolant enters tubing 40 in a nonmagnetic heat exchanger 52 through a duct 51. Cooling fins 53 are attached to heat exchanger 52. An electrically-insulating, nonmagnetic support 55 attached to heat exchanger 52 holds a nonmagnetic gas baffle 54. Coolant emerting from tubing 50 in heat exchanger 52 flows through a duct 56 to the axial center region of stator 31, returning through a central passageway 57 to emerge from frame 10 for transmittal to pumping and cooling apparatus (not shown) which returns the coolant to duct 40 after reducing its temperature.

By being situated at opposite ends of stator 31, heat exchangers 42 and 52 serve to cool the stator by carrying away heat generated by electrical current flow in the stator windings. The circulating coolant is heated as it flows through circular passageway 48, absorbing heat from windings 33 conducted through stator laminations 32. The coolant is further heated in heat exchangers 42 and 52 by heat rediated from the ends of windings 33. Heat from windings 33 is also carried by gas flow to the heat exchangers since rotation of end disks 16 and 17 forces gas flow by centrifugal force radially-outward through fins 43 and 53, respectively, thus transferring heat to the coolant in tubes 41 and 50, respectively. The gas, upon emerging from the radially-outermost portions of fins 43 and 53, is deflected by baffles 44 and 54, respectively, first axially-inward, and thence radially-inward through the ends of windings 33 where it acquires heat. The gas flow then progresses further radially-inward until deflected axially-outward by the stator structure so as to again be forced radially-outward by centrifugal force due to end disk rotation.

The foregoing describes a compact, lightweight flywheel motor/generator drive of high efficiency and of low manufacturing and maintenance costs, wherein a rotor of low windage losses and improved mechanical integrity is located outside the stator.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

I claim:
1. A homopolar inductor motor/alternator comprising:
   a stator yoke;
   an excitation field winding encircling the mid-axial region of said stator yoke;
   first and second stacks of stator laminations encircling said stator yoke on either axial side of said excitation field winding;
   a plurality of stator windings situated in axially-directed slots formed by said first and second stacks of stator laminations;
   an inner rotor ring encircling each stack of said stator laminations and rotatable thereabout, each said rotor ring comprising alternate magnetic poles and nonmagnetic regions; and
   an outer rotor ring encircling, and bonded to, each inner rotor ring, said outer rotor ring comprising a high strength magnetic material.
2. The appartus of claim 1 wherein each of said magnetic poles includes a plurality of magnetically polarized laminations and wherein each of said nonmagnetic regions includes a mass of nonmagnetic metal.
3. The apparatus of claim 2 including axially-directed slots in the radially-inner surface of each of said magnetic poles.
4. The apparatus of claim 1 wherein said outer rotor ring constitutes an axially-oriented cylinder, said cylinder being attached at each end through support means, respectively, to end disks rotatable in unison with said cylinder.
5. The apparatus of claim 4 including baffle means located inward of said support means, and heat exchanger means located radially-inward of said baffle means, said baffle means directing gas flow from the ends of said stator windings over said heat exchanger means so as to cool said gas flow.
6. The apparatus of claim 5 including duct means circulating coolant into and out of said motor/alternator, said duct means extending over the periphery of said stator yoke and communicating with said heat exchanger means.
7. A homopolar motor/alternator comprising:
   a stator yoke;
   a stack of stator laminations encircling said stator yoke;
   a plurality of stator windings situated in axially-directed slots formed by a said stack of stator laminations;
   an inner rotor ring encircling said stator laminations and alternate magnetic poles and nonmagnetic regions;
   an outer rotor ring encircling, and bonded to, said inner rotor ring, said outer rotor ring comprising a high strength magnetic material; and
   means establishings a unidirectional magnetic flux path extending between said stator yoke and said outer ring.
8. The apparatus of claim 7 wherein each of said magnetic poles includes a plurality of magnetic laminations and each of the nonmagnetic regions includes a mass of nonmagnetic metal.
9. The appartus of claim 8 including axially-directed slots in the radial inner surface of each of said magnetic poles.
10. The apparatus of claim 7 wherein said outer rotor ring constitutes an axially-oriented cylinder, said cylinder being attached at each end through support means, respectively, to end disks rotatable in unison with said cylinder.
11. The apparatus of claim 10 including baffle means located radially-inward of said support means, said baffle means directing gas flow from the ends of said stator windings over said heat exchanger means so as to cool said gas flow.
12. The appartus of claim 11 including duct means circulation coolant nto and out of said motor/alternator, said duct means extending over the periphery of said stator yoke and communicating with said heat exchanger means.
13. The apparatus of claim 8 wherein said means establishing a unidirectional magnetic flux path comprises an excitation flield winding encircling said stator yoke.
14. The apparatus of claim 9 wherein said means establishing a unidirectional magnetic flux path comprises an excitation field winding encircling said stator yoke.
15. The apparatus of claim 10 wherein said means establishing a unidirectional magnetic flux path comprises an excitation field winding encircling said stator yoke and encircled by said outer rotor ring.
16. A multipole homopolar inductor motor/alternator comprising:
   a stator yoke;
   an excitation field winding encircling the mid-axial regin of the said stator yoke;
   first and second stacks of stator laminations encircling said stator yoke on either axial side of said excitation field winding;
   a plurality of stator windings situated in axially-directed slots formed by said first and second stacks of stator laminations;
   first and second inner rotor rings encircling said first and second stacks of said stator laminations, respectively, each of said inner rotor rings comprising alternate magnetic poles and nonmagnetic regions and being angularly offset from each other substantially by 45°; and
   an outer rotor ring encircling, and bonded to, each of said inner rotor rings, said outer rotor ring comprising a high strength magnetic material.
17. The apparatus of claim 16 wherein the poles of said first rotor ring are of one polarity and the poles of said second inner rotor ring are of opposite polarity.
18. The apparatus of claim 17 wherein each of said magnetic poles includes a polarity of magnetically-polarized laminations and wherein each of said nonmagnetic regions includes a mass of nonmagnetic metal.
19. The apparatus of claim 18 including axially-directed slots in the radially-inner surface of each of said magnetic poles.
20. The apparatus of claim 19 wherein said slots in the radially-inner surface of each of said magnetic poles contain amortisseur windings.

* * * * *